MULTIPLEX MODULATION COMMUNICATION SYSTEM

Filed Aug. 2, 1957 3 Sheets-Sheet 1

INVENTOR.
SIDNEY METZGER
BY Charles H. Brown
ATTORNEY

Feb. 16, 1960 S. METZGER 2,925,469

MULTIPLEX MODULATION COMMUNICATION SYSTEM

Filed Aug. 2, 1957 3 Sheets-Sheet 2

INVENTOR.
SIDNEY METZGER
BY Charles H. Brown
ATTORNEY

Feb. 16, 1960 S. METZGER 2,925,469

MULTIPLEX MODULATION COMMUNICATION SYSTEM

Filed Aug. 2, 1957 3 Sheets-Sheet 3

INVENTOR.
SIDNEY METZGER
BY Charles H. Brown
ATTORNEY 2,925,469
Patented Feb. 16, 1960

2,925,469

MULTIPLEX MODULATION COMMUNICATION SYSTEM

Sidney Metzger, Princeton, N.J., assignor to Radio Corporation of America, a corporation of Delaware Application August 2, 1957, Serial No. 676,030

21 Claims. (Cl. 179—15)

The invention relates to multiplex communication systems and, particularly, to a time division multiplex modulation system using magnetic cores and transistors to perform functions previously performed by other equipment.

Multiplex communication systems now available require the use of complicated circuits including expensive equipment such as vacuum tubes, electronic and mechanical commutators or distributors, and so on. A commutator is usually provided at the transmitting end to sequentially turn on or sample a plurality of modulator stages. A different source of signal energy is individually connected to each of the modulator stages. As each modulator stage is turned on by the commutator, a modulated output signal is produced in a desired manner by the modulator stage according to the signal energy applied to the modulator stage during the sampling interval. The output circuits of the respective modulator stages are all connected to a common output circuit so that the modulated output signals produced sequentially by the modulator stages and originating over separate channels are made available for transmission over a single communication path in multiplex fashion. The communication path may include a radio frequency or other known transmission system.

The multiplex signal is received at the receiving end of the communication system and fed to a suitable commutator. The commutator functions to distribute the modulated signals included in the multiplex signal over separate paths or channels to different demodulator stages. The outputs of the demodulator stages are fed to utilization circuits.

Multiplex communication systems of the type described require the use of both communicating and channel modulating equipment at the transmitting end. The modulator stages, demodulator stages and commutators used in such systems tend to be expensive to construct and maintain in terms of the number and type of components used and the resulting power consumption. In addition, the size, weight and number of components required create problems in the design and packaging of equipment including such communication systems. The size and weight (or portability) of the equipment is of particular concern when included in telemetering and similar systems.

It is an object of the invention to provide an improved multiplex communication system.

A further object is to provide a novel time division multiplex modulation communication system using magnetic cores and transistors to perform functions previously performed by other equipment.

Another object is to obtain a novel time division multiplex communication system in which the commutating and modulating functions for each channel at the transmitting end are performed by a single circuit including a transistor and magnetic core, and in which the commutating and demodulating functions are performed at the receiving end by magnetic core and transistor circuits.

Still another object is to provide a time division multiplex modulation communication system which is more compact in construction and simpler in operation than the time division multiplex modulation communication systems now known.

According to the invention, a transistorized magnetic core ring counter is provided at the transmitting end of a time division multiplex modulation communication system. Separate sources of tone or voice modulating signal energy are individually coupled to all but one of the magnetic cores in the ring counter. The ring counter functions in each cycle of operation to first produce a marker or synchronizing signal and to, thereafter, sample the modulating signal energy supplied by first one and then another of the sources. As the modulating signal energy supplied by each source, is sampled, a modulated output signal is produced, the modulated output signal being determined in a desired manner according to the modulating signal energy occurring during the sampling interval. The marker signal and the sequentially produced modulated output signals are fed from the ring counter to a common output circuit. The common output circuit functions to combine the marker signal and modulated output signals for transmission over a single communication path in multiplex fashion. A feature of the invention is the use of a transistorized magnetic core ring counter to perform both the modulating and commutating functions at the transmitting end of a time division multiplex modulation communication system.

The multiplex signal is received at the receiving end of the communication system and is fed to a circuit including a transistorized magnetic core shift register. The magnetic core shift register is operated in synchronism with the operation of the ring counter by means of the marker signals to distribute or direct the modulated signals included in the multiplex signal over separate channels to different demodulator stages.

In the particular application of the invention to be described, the ring counter at the transmitting end of the communication system operates as a pulse position modulation system, whereby the time of each of the modulated signals produced in the manner described is varied according to the amplitude of the modulating signal energy during the sampling interval. Each of the demodulator stages includes a transistor bistable multivibrator and a low-pass filter. The multivibrators each function in response to the pulse position modulated signals and in response to the marker signals received to produce pulse width modulation signals. A signal which is representative of the modulating signal energy originally supplied by a corresponding one of the sources at the transmitting end of the communication system is derived for application to a utilization circuit by feeding the pulse width modulation signals through the low-pass filter.

By means of the invention, a time division multiplex modulation communication system is provided which is compact in construction, low in power consumption and readily adaptable for use in systems where size and weight of the equipment are important factors.

A more detailed description of the invention will now be given in connection with the accompanying drawing in which.

Figures 1, 2, 3, 4:
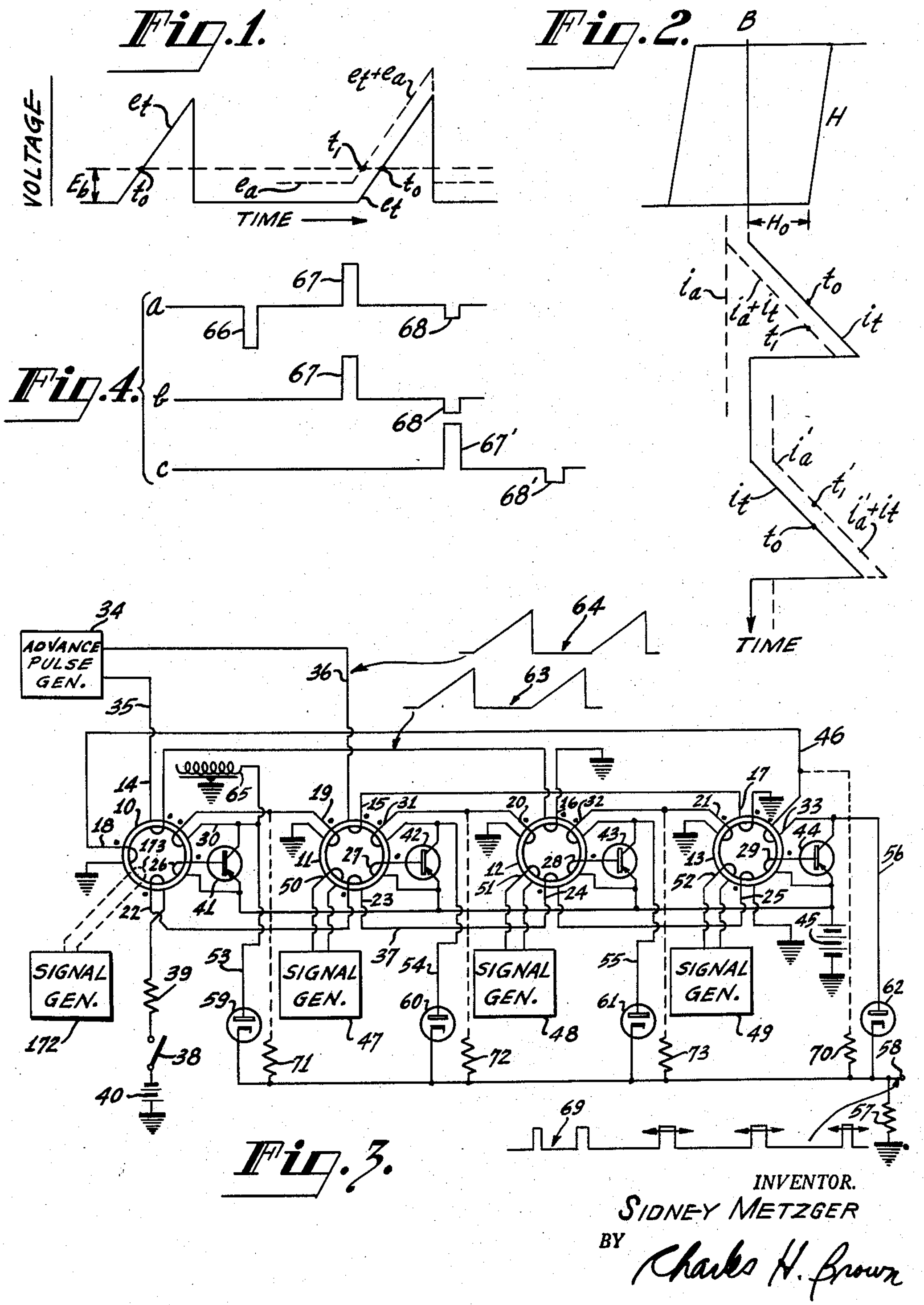
Figure 1 and Figure 2 are waveforms useful in describing the operation of a pulse position modulation system using magnetic cores.
Figure 3 is a transistorized magnetic core ring counter used according to the invention at the transmitting end of a pulse position modulation, time division multiplex communication system.
Figure 4 is a series of waveforms useful in describing the operation of the arrangement shown in Figure 3.

A typical method of generating a time modulated pulse in a position modulation system is shown in Figure 1. A waveshape having a linear rate of rise, such as a sawtooth $e_t$, is impressed upon a circuit which generates a pulse at time $t_0$ when $e_t$ reaches some comparison bias level such as $E_b$. If the positive modulating voltage $e_a$ is added to the sawtooth voltage, it is seen that the resultant voltage $e_t+e_a$ will reach the comparison bias $E_b$ at an earlier time $t_1$. Similarly, if $e_a$ were negative, the resultant of $e_a+e_t$ would equal $E_b$ at a time later than $t_0$. Thus, as $e_a$ varies in accordance with the incoming intelligence, the instant at which $e_a+e_t$ reaches comparison level, and therefore the time of occurrence of the pulse, varies accordingly.

Figure 2 shows how a magnetic core with a substantially rectangular B(flux density)-H(magnetizing force) curve can be used as a comparator for time modulation. The distinguishing feature of the material used in the magnetic core is the abrupt increase (or decrease) in B when the magnetizing force exceeds a threshold value $H_0$ (or $-H_0$). This phenomenon may be used to produce pulse position modulation.

The operation and construction of magnetic cores per se is known in the art and a detailed description thereof is unnecessary. A magnetic core is a circuit element having a substantially rectangular hysteresis loop of low coercive force. Certain materials such as molybdenum permalloy and zinc-manganese-magnesium ferrite exhibit a substantially rectangular hysteresis loop. A magnetic core is capable of being magnetized to saturation in either one of two directions. In one direction, a positive or active state is said to arise in which the direction of retentivity is opposite to that which would result from the application of a shift or sensing pulse to the magnetic core. In the second direction, a negative or inactive state is said to arise in which the direction of retentivity is the same as that which would result from the application of a shift pulse to the magnetic core.

A magnetic core in the active or positive state is said to contain a "one," and a magnetic core in the negative or inactive state is said to contain a "zero." When a magnetic core is shifted from an active state to an inactive state, a voltage is induced in an output winding on the core resulting in a current flow through the output winding of one polarity. A voltage is induced in the output winding on the core when the magnetic core is shifted from an inactive to an active state such that a current of the opposite polarity flows through the output winding. The polarity of the current flow through the output winding will in each case depend upon the direction in which the output winding is wound on the core.

In the example given in Figure 2, a sawtooth shaped current $i_t$ flows through a winding on the magnetic core. When the current $i_t$ increases to the value shown at $t_0$, at which time it produces a magnetomotive force $H_0$, there is a very large increase in flux in the magnetic core. The resulting increase in voltage induced in any of the windings on the magnetic core may be used to trigger, for example, a pulse generator. If a modulating signal current flows through another winding on the magnetic core, the net magnetizing force is the resultant of that due to the sawtooth current $i_t$ (times the number of turns through which it flows) and that due to the modulating current (times the number of turns through which it flows). If the modulating signal current $i_a$ is of the opposite polarity to the current $i_t$, the resultant magnetizing force $H_0$ (the algebraic sum of $i_a+i_t$) is reached at a time $t_1$ which is later than the time $t_0$ occurring in the case of no modulation. If the modulating signal current $i'_a$ is of the same polarity as the current $i_t$, the resultant magnetizing force $H_0$ (the algebraic sum of $i_a'+i_t$) is reached at a time $t_1'$, which is earlier than the time $t_0$. Thus, the time at which the magnetic core changes state, producing a voltage change in a winding and, as a result, a signal for application to a utilization circuit, can be advanced or retarded as a function of the amplitude of a modulating signal. The time displacement will be linearly related to the modulating voltage if the leading edge of the sawtooth is reasonably linear over the region of interest. If a non-linear relation between time and modulating voltage is required, a suitably shaped current may be used.

Referring to Figure 3, a transistorized magnetic core ring counter is shown which is arranged to function as a four-channel pulse position multiplex modulation system according to the invention. The ring counter includes four magnetic cores 10 through 13. A plurality of windings or coils are mounted on each of the magnetic cores 10 through 13. Reading in a counter-clockwise direction, the windings are designated as an advance or trigger winding 14 through 17, an input winding 18 through 21, a set winding 22 through 25, a transistor base winding 26 through 29 and a transistor collector or output winding 30 through 33, respectively. The advance windings 14, 16 on the respective magnetic cores 10, 12 are connected in series to an advance pulse generator 34 over a lead 35, and the advance windings 15, 17 on the respective magnetic cores 11, 13 are connected in series to the pulse generator 34 over a second lead 36. The set windings 22 through 25 are connected in series over an electrical path including a lead 37, on-off switch 38, a resistor 39 and a source of unidirectional potential represented by a battery 40. As shown in the drawings, the set winding 22 is wound on the magnetic core 10 in a direction opposite to that in which the set windings 23 through 25 are wound on the magnetic cores 11 through 13, respectively.

The number of turns for each winding on the magnetic cores may, of course, be determined by known means and procedures. In an application of the invention which has been constructed, the frequency of the generator 34 was set so that each magnetic core channel was sampled at a 10 kilocycle rate for voice transmission. A peak sawtooth current of 30 milliamperes was chosen. The advance windings 14 through 17 each had 5 turns, the input windings 18 through 21 each had 5 turns, the set windings 22 through 25 each had 20 turns, the base windings 26 through 29 each had 20 turns and the collector windings 30 through 33 each had 20 turns. In practice, the sampling may occur at a lower frequency rate as used for telemetering and at higher rates as used for program transmission or other higher frequency applications. The values given above by way of example may be determined in a particular application according to the core material used, current required to switch the core, and so on. The current fed through the advance windings 14 through 17 to switch the cores should be half that of peak sawtooth current in order to obtain a maximum of symmetrical modulation capability.

A separate P–N–P junction transistor of N type conductivity is regeneratively connected to each of the magnetic cores 10 through 13. The transistors 41 through 44 are each arranged to be normally nonconducting. The base electrode of transistor 41 is connected to one end of the base winding 26, while the collector electrode of transistor 41 is connected to one end of the collector winding 30 on the magnetic core 10. The emitter electrode of the transistor 41 and the other end of the base winding 26 are connected to the positive terminal of a source of unidirectional potential represented by a battery 45. Transistors 42 through 44 are connected to the magnetic cores 11 through 13, respectively, in the same manner. By way of example, the transistors 41 through 44 may be of the type designated in the art as 2N105. However, other types of P–N–P junction transistors of N type conductivity may be used without departing from the spirit of the invention.

In order to provide a ring counter according to the invention, the output winding on each of the magnetic cores 10 through 13 is connected to the input winding on the succeeding magnetic core. Thus, the end of the output winding 30 on the magnetic core 10 opposite to the end thereof connected to the collector electrode of the transistor 41 is connected to one end of the input winding 19 on the next magnetic core 11, the other end of the input winding 19 being connected to ground. The term ground, as used in the specification, is to be understood as referring to a point of fixed or zero alternating current reference potential. The output winding 31 on the magnetic core 11 is connected to the input winding 20 on the magnetic core 12 and the output winding 32 on the magnetic core 12 is connected to the input winding 21 on the magnetic core 13 in a similar manner. The output winding 33 on the last magnetic core 13 in the chain is connected to the input winding 18 on the first magnetic core 10 over a lead 46 also in a similar manner.

Separate sources of modulating signal energy represented in the drawing by the blocks 47 through 49 and designated as signal generators are individually coupled to the magnetic cores 11 through 13 via windings 50 through 52, respectively. The signal generators 47 through 49 may be of any suitable type known in the art and may be designated to produce signal energy in the form of voice, tone or other intelligence. The collector electrodes of the transistors 41 through 44 are connected over separate leads 53 through 56 to a common output circuit including a resistor 57 connected to ground and an output terminal 58. A separate diode or unidirectional current conducting device 59 through 62 is connected in each of the leads 53 through 56, respectively. The diodes 59 through 62 are poled in the proper direction such that the modulated output signals produced in a manner to be described are applied in multiplex fashion to the output terminal 58 for application over a single communication path to a utilization circuit which may include a radio frequency transmitter or similar equipment.

In the operation of the ring counter shown in Figure 3, the normally open switch 38 is first closed. This action completes an electrical path from battery 40 through the series connected set windings 22 through 25. The set windings 23 through 25 are wound on the magnetic cores 11 through 13, respectively, in such a direction that the voltage induced in the set windings 23 through 25 causes the respective magnetic cores 11 through 13 to each assume a "zero" state. If one or more of the magnetic cores 11 through 13 are already in a "zero" state, the status of the magnetic cores is merely confirmed. As previously pointed out, the set winding 22 is wound on the magnetic core 10 in a direction opposite to the direction in which the set windings 23 through 25 are wound on the magnetic cores 11 through 13. The set winding 22 is wound on the magnetic core 10 in such a direction that the voltage induced in the set winding 22 causes the magnetic core 10 to assume a "one" state. If the magnetic core 10 is already in a "one" state, the status thereof is merely confirmed. Upon the release of the switch 38, therefore, magnetic core 10 is in a "one" state and the remaining magnetic cores 11 through 13 are in a "zero" state.

The advance pulse generator 34 functions to supply a first train 63 of advance pulses over lead 35 to the series connected advance windings 14, 16 and to supply a second train 64 of advance pulses over lead 36 to the series-connected advance windings 15, 17. The pulses supplied over the respective leads 35, 36 occur at the same rate of repetition or frequency. However, the pulses supplied over one of the leads are delayed, for example, a half period with respect to the pulses supplied over the other lead. The separation or phasing of the two advance pulse trains 63, 64 can be other than one-half period or one-hundred and eighty degrees as long as the advance pulse trains are not coincidental. The pulses supplied over the leads 35, 36 by the pulse generator 34 have a unidirectional waveshape with, for example, a 20 microsecond leading or sloping edge. Such a waveshape may be approximated by a triangular, sawtooth, rectified sine wave or other properly shaped pulse wave. The pulse generator 34 may be of any suitable type known and may, for example, include a source of sine or square waves to which the necessary delay and wave shaping circuits are connected.

The advance windings 14 through 17 are wound on the respective magnetic cores 10 through 13 in a direction such that the application of an advance pulse to an advance winding causes the magnetic core upon which the advance winding is wound to assume a "zero" state. When the first advance pulse of the pulse train 63 is applied to the advance windings 14 and 16, the status of the magnetic core 12 in a "zero" state is confirmed. Since the magnetic core 10 is in a "one" state, the application of the advance pulse to the advance winding 14 causes the magnetic core 10 to start to shift into a "zero" state. A negative voltage is induced in the base winding 26. As a result, the emitter electrode becomes sufficiently positive with respect to the base electrode of the transistor 41 to cause the transistor 41 to conduct. The current flow through the collector winding 30 causes, due to the direction in which the collector winding 30 is wound on the magnetic core 10, a more negative voltage to be induced in the base winding 26, biasing the base electrode of the transistor 41 more negative. By this regenerative action, the transistor 41 is made to conduct more heavily. When the magnetic core 10 is shifted into the "zero" state thereof, the magnetic coupling through the magnetic core 10 is reduced substantially to zero and the transistor 41 ceases conducting.

During the period in which the transistor 41 is conducting, current flows through the input winding 19 on the next magnetic core 11 in a direction such that the current flowing in the input winding 19 by the conduction of the transistor 41 causes the magnetic core 11 to shift into a "one" state. The single eletcrical condition or "one" state has, therefore, been shifted from the magnetic core 10 to the magnetic core 11. At the time that the magnetic core 11 changes state, a voltage is induced in the base winding 27. However, the base winding 27 is wound in such a direction that a positive going voltage is induced therein. As a result, transistor 42 remains nonconducting. Thereafter, the first advance pulse of the pulse train 64 is applied from the pulse generator 34 to the advance windings 15, 17 over lead 36. The status of the magnetic core 13 in a "zero" state is confirmed. The application of the advance pulse to the advance winding 15 causes the magnetic core 11 to start to shift into a "zero" state. Transistor 42 conducts according to the regenerative action described. The magnetic core 11 is shifted into a "zero" state, and the magnetic core 12 is shifted into a "one" state. As additional advance pulses are applied to the advance windings 14, 16 over lead 35 and to the advance windings 15, 17 over lead 36 in the alternate manner described, the "one" state is advanced from magnetic core to magnetic core along the chain on a continuous or circulatory basis. A ring counter or commutating action is therefore produced in that first one and then another of the magnetic core-transistor circuits in the chain are placed in operation.

In a time division multiplex system, it is necessary to add a synchronizing signal to the output pulse train so that the commutator or distributor at the receiving end of the system can operate in the proper frequency and phase with that of the transmitting end. It is customary to provide a synchronizing signal each frame or cycle. Typical signals used for this purpose include (1) a sync pulse of several times greater duration than the channel or modulated pulses, (2) two signals of relatively close spacing, and (3) leaving a suitable gap in the pulse train. Any of these methods may be used in the multiplex system of the invention.

Referring to the magnetic core 10-transistor 41 circuit, one of the methods of providing a synchronizing signal, the second, is illustrated. Each time the magnetic core 10 is made to change from a "one" to a "zero" state and transistor 41 conducts, a positive pulse will appear at the collector electrode of transistor 41 for application to the terminal 58 over lead 53 and through diode 59 which is poled in the proper direction to pass the pulse. An open circuited delay line 65 is connected to the collector electrode. A second pulse delayed according to the setting of the line 65 is produced following the first pulse and fed to terminal 58 over lead 53 and through diode 59. The pair of pulses, therefore, constitute a marker or synchronizing signal. A second way of producing the double pulse marker signal separated from each other by a few microseconds would be to connect two magnetic core-transistor circuits in parallel. The number of turns for the sawtooth winding on one core should be less than that of the number of turns for the sawtooth winding on the other core, thus, delaying the pulse produced by the former core with respect to the pulse produced by the latter. In any case, each cycle of operation of the ring counter is begun by the production of a synchronizing signal through the operation of the first channel including magnetic core 10-transistor 41.

Assuming that the magnetic core 11 has been placed in a "one" state, the next sawtooth applied to winding 15 will cause the magnetic core 11 to start to change state. Transistor 42 conducts by the regenerative action described. In the absence of modulation, the amplitude of the sawtooth current, the number of turns on the associated windings, and the value of $H_0$ for the core material used are chosen so that the transistor 42 conducts and an output pulse is produced at a time corresponding to half peak sawtooth amplitude. As mentioned, a signal generator 47 is coupled to the magnetic core 11 via winding 50. The signal energy supplied via winding 50 serves to modulate the magnetic core 11 in the manner described in connection with Figure 2. The number of turns on the signal winding 50 and the amplitude of the peak signal current are chosen so that a peak positive modulation signal would advance the output pulse to occur at a time $T/2$ seconds before its unmodulated position, where T is the time of the sawtooth. A peak negative modulation signal would delay the output pulse an equal amount. In other words, the time at which the transistor 42 conducts is advanced or retarded according to the time at which the sum of the sawtooth current and modulating signal equals the magnetomotive force $H_0$. A pulse which is position or time modulated as a function of the amplitude of the modulating signal appears at the collector electrode of transistor 42. This implies modulation with equal amplitude excursions from the quiescent state.

If it was desired to transmit a function which varied in only one direction, such as a signal corresponding to the altitude of a plane above sea level, the parameters of the channel would be chosen so as to position the output pulse at one extreme of the sawtooth corresponding to seat level, and at the other extreme for the highest altitude expected. In the latter case, as in the previous one, the peak-to-peak deviation cannot exceed T seconds. It should be noted that direct current signals may be transmitted using the system of the invention. The direct current flowing through the modulating signal winding 50 adds (or subtracts) a fixed magnetomotive force from that produced by the sawtooth current thus advancing (or delaying) the resultant pulse.

Referring to Figure 4, waveform 4*a* illustrates the signal appearing at the collector electrode of transistor 42. The first negative pulse 66 is that induced in the winding 31 when the magnetic core 11 is shifted from a "zero" state to a "one" state. The transistor 42 does not conduct at this time because the voltage is of the wrong polarity. When the magnetic core 11 is shifted into a "zero" state, transistor 42 conducts and the positive pulse 67 is produced. The current due to this pulse also shifts the next magnetic core 12 to the "one" state. At the time of the negative pulse 68, the magnetic core 12 is shifted into a "zero" state, producing the negative pulse at the collector electrode of transistor 42 by the voltage induced in winding 20. Pulse 67 is smaller than pulse 66, since the transistor 42 conducts during pulse 67 and loads down the circuit. The amplitude of pulse 68 is dependent on the number of turns on the winding 20 which couples the two magnetic cores 11, 12. Waveform 4*b* illustrates the signal at the winding 31 side of the input winding 20 on the magnetic core 12. Only the pulses 67, 68 are present, since the pulse 66 can not appear at this point due to the open circuit condition of the transistor collector electrode during the duration of pulse 66. Waveform 4*c* illustrates the signal at the winding 32 side of the winding 21 on the magnetic core 13, and so on.

The operation of the magnetic core 12-transistor 43 circuit or third channel and of the magnetic core 13-transistor 44 circuit or fourth channel is exactly the same as described in connection with the magnetic core 11- transistor 42 circuit. The three modulation channels are operated in turn to sample during discrete intervals the modulating signal energy supplied thereto. The synchronizing signal appearing at the collector electrode of transistor 41 and the time modulated signals appearing sequentially at the collector electrodes of the transistors 42 through 44 are fed over the respective leads 53 through 56 to the terminal 58. The diodes 59 through 62 insure that only the proper pulse is applied from each channel to the terminal 58. For example, the diode 60 will pass only the positive pulse 67 which is modulated by the second channel. Pulse 66 is modulated by the first or synchronizing channel, while pulse 68 is modulated by the third channel including magnetic core 12-transistor 43. It is to be noted that pulse 67 is greater at the collector electrode than at the winding 20, since the impedance at the collector electrode includes both winding 31 and winding 20. Only the winding 20 is effective when measuring at the winding 20. A multiplex signal similar to the waveform 69 will appear at the terminal 58 for each cycle of operation of the four-channel multiplex modulation system. The double marker or synchronizing signal is followed by the three time modulated pulses sequentially produced by the three modulating channels of the ring counter, each modulating channel performing both a pulse time modulating and commutating function.

Various modifications may be made to the arrangement shown in Figure 3 without departing from the spirit of the invention. In order to minimize the number of windings on each magnetic core, the set windings 23 through 25 may be used for modulation purposes in place of the windings 50 through 52. The set windings 22 through 25 connected in series are normally open circuited by switch 38 after the ring counter has been started in operation. Thus, the modulating signal for each magnetic core may be connected across the set winding of that particular magnetic core.

While the diodes 59 through 62 are shown as coupling means, the arrangement shown in Figure 3 could be further simplified by removing leads 53 through 56 and diodes 59 through 62. Resistors 70 through 73 of suitable value are connected across the input windings 18 through 21, respectively, to the terminal 58, as indicated by the dotted lines. The pulse 68 will subtract from the pulse 67', described above, but by suitable choice of turns of the input winding compared to the collector winding on the preceding magentic core in the ring counter pulse 68 may be only 10 or 20 percent as large as pulse 67'. Combining the two pulses will decrease the pulse amplitude as compared to that obtained with diodes, but a single stage such as a transistor amplifier amplifying the combined output of all channels may in some applications be preferable to individual diodes.

The description has been directed up to this point to the transmitting end of the time division multiplex modulation system and, particularly to the transistorized magnetic core ring counter arranged for operation in the system according to the invention. A multiplex signal similar to the waveform 69 will appear at terminal 58 for application to a suitable radio frequency transmitter or other transmission means. The multiplex signal is received by suitable receiving equipment and is fed to a distributing-demodulating circuit arrangement which functions to feed the signals included in the multiplex signal to utilization circuits.

Figure 5:
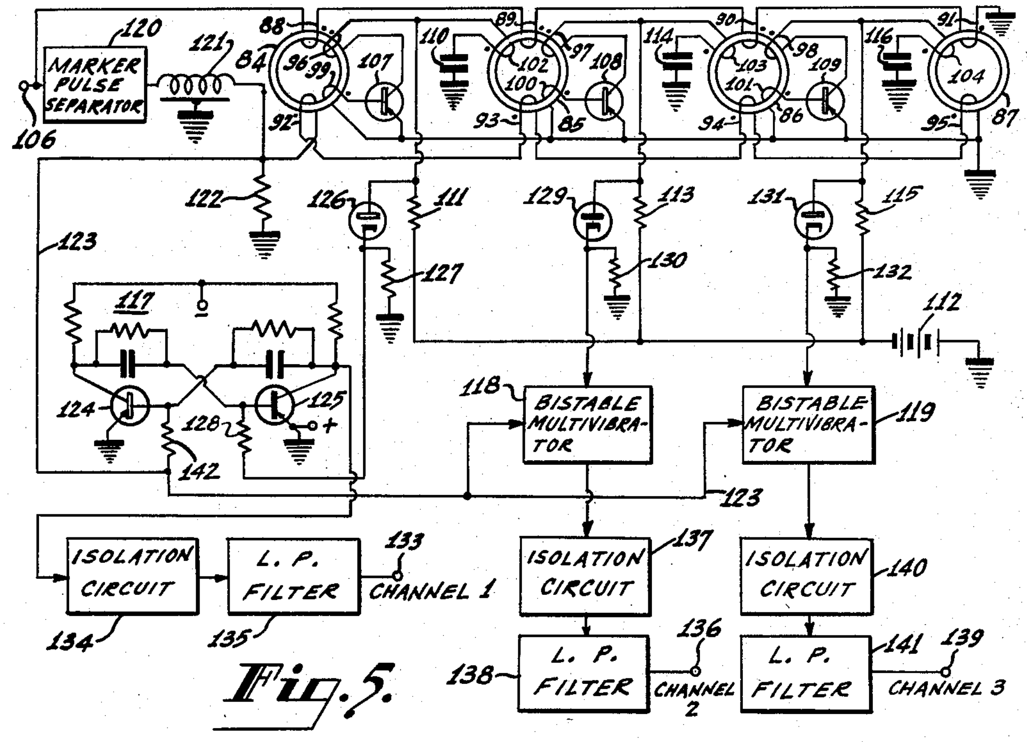
Figure 5 shows one embodiment of a magnetic core commutator and transistorized demodulator arrangement used according to the invention at the receiving end of a pulse position modulation, time division multiplex communication system.

One embodiment of a magnetic core-transistor distributing-demodulating circuit ararnged according to the invention is shown in Figure 5. Four magnetic cores 84 through 87 are connected to form a chain of magnetic cores or magnetic core shift register. Each of the magnetic cores 84 through 87 includes an advance or shift winding 88 through 91 and a set winding 92 through 95, respectively. The magnetic cores 84 through 86 each include an output or collector winding 96 through 98 and a base winding 99 through 101, respectively. An input winding 102 through 104 is mounted on each of the magnetic cores 85 through 87, respectively.

The advance windings 88 through 91 are connected in series to an input terminal 106 to which the incoming multiplex signal is applied. A separate P–N–P junction transistor of N type conductivity is regeneratively connected to each of the magnetic cores 84 through 86. The transistors 107 through 109 are normally nonconducting and may be of the type designated as 2N105. However, other types of P–N–P junction transistors may be used, depending upon the requirements of a particular application. The base electrode of the transistor 107 is connected through the base winding 99 to ground, the emitter electrode being connected to ground. The collector electrode of the transistor 107 is connected to ground over an electrical path including the collector winding 96, input winding 102 on the magnetic core 85 and a capacitor 110. A resistor 111 is connected across the input winding 102 and capacitor 110 to the negative terminal of a source of unidirectional potential represented by a battery 112. The succeeding magnetic cores in the chain are connected in a similar manner. Thus, the magnetic core 85 is connected to the magnetic core 86 by a circuit arrangement including transistor 108, the collector winding 97, input winding 103, resistor 113 and capacitor 114. The magnetic core 86 is connected to the magnetic core 87 by a circuit arrangement including transistor 109, collector winding 98, input winding 104, resistor 115 and capacitor 116.

The input terminal 106 is connected to one side of three transistor bistable multivibrators 117 through 119 of conventional design over an electrical path including a marker pulse or synchronizing signal separator 120, a delay line 121, a resistor 122 connected to ground and lead 123. The multivibrators 118, 119 are similar in construction to the multivibrator 117 shown in detail. The multivibrator 117 includes a pair of P–N–P transistors 124, 125 of N type conductivity interconnected such that either one of two stable states may be obtained. In one stable state, transistor 124 conducts and transistor 125 is cut-off. In the second stable state, transistor 125 conducts and transistor 124 is cut-off. The operation of such a circuit is known in the art and need not be described in detail. As shown in Figure 5, the marker pulse separator 120 is connected over lead 123 and through resistor 142 to the base electrode of transistor 124 or left hand side of multivibrator 117. The separator 120 is connected over lead 123 in the same manner to the left hand side of the multivibrators 118, 119. The set windings 92 through 95 are connected in series across the resistor 122.

A tapping point in the connection between the collector winding 96 and input winding 102 is connected to the base electrode of transistor 125 or right hand side of multivibrator 117 over an electrical path including a diode 126, resistor 127 connected to ground and resistor 128. In a similar manner, a tapping point in the connection between the collector winding 97 and input winding 103 is connected to the right hand side of the multivibrator 118 over an electrical path including a diode 129 and resistor 130 connected to ground. A tapping point in the connection between the collector winding 98 and the input winding 104 is connected to the right hand side of multivibrator 119 over an electrical path including diode 131 and resistor 132. While vacuum tube diodes 126, 129 and 131 are shown, any suitable unidirectional current conducting device may be used. The collector electrode of transistor 125 functioning as the output connection from the multivibrator 117 is connected to an output terminal 133 over an electrical path including an isolation circuit 134 and a low-pass filter 135. The output terminal 133 is indicated as channel 1 and may be connected to any suitable receiving device such as a loud speaker or code recording device through suitable amplifying and signal shaping circuits. Similarly, the output of multivibrator 118 is connected to an output terminal 136 over an electrical path including an isolation circuit 137 and a low-pass filter 138. The output terminal 136 is indicated as channel 2. The output of the multivibrator 119 is connected to an output terminal 139 over an electrical path including an isolation circuit 140 and a low-pass filter 141, terminal 139 being indicated as channel 3. As in the case of terminal 133, the terminals 136, 139 may be connected to a loud speaker, code recording device or other suitable receiving equipment. The isolation circuits 134, 137 and 140 may include a single amplifying or coupling stage and function to prevent the loading of the multivibrators 117 through 119 by the respective filter circuits.

Reference will be made to the waveforms given in Figure 6 in describing the operation of the arrangement of Figure 5. A multiplex signal 147 similar to the signal 69 shown in Figure 3 and including in each frame or cycle a double marker or synchronizing signal followed by three time modulated pulses, appears at terminal 106. The multiplex signal is applied over one path to the series-connected advance windings 88 through 91 and over a second path to the marker pulse separator 120. The separator 120 operates in response to the synchronizing signal first received to produce a single pulse of fixed time spacing with respect to the synchronizing signal and separate from the channel pulses. The operation of the separator 120 will, of course, depend upon the type of synchronizing signal used and may be constructed in any of several ways known in the art. If the synchronizing signal consists of a gap in the pulse train, a circuit including a charging capacitor which is discharged by the reception of each pulse may be used, the gap in the pulse train permitting this capacitor to charge to twice normal voltage and thus, in conjunction with a suitably biased circuit, provide a marker pulse once per frame.

In the example given, the incoming pulse train may be fed into an open circuited delay line of delay time $T_1/2$ seconds. Each of the double marker pulses, as well as the channel pulses, produces a delayed echo $T_1$ seconds later due to reflection from the open circuited far end of the line. As shown in the waveform 148, the echo from the first marker pulse adds to the second marker pulse arriving $T_1$ seconds after the first and substantially doubles the amplitude of the second pulse. Reflections or echoes of the second marker pulse and channel pulses are also produced $T_1$ seconds thereafter. Since no other pulses are present when the latter mentioned echoes and reflections are produced, the original first marker pulse, the reflection of the original second marker pulse, channel pulses and echoes thereof are all of equal height. An amplitude gate may be employed to select or separate the single double amplitude pulse. As shown in waveform 149, a single separated marker pulse appears at the output of the separator 120. A similar result could be obtained by the use of an integration circuit.

The advance windings 88 through 91 are all wound on the respective magnetic cores 84 through 87 in a direction such that the voltage induced in the windings by the reception of the marker pulses and channel pulses causes each of the magnetic cores to assume the "zero" state. The separated marker pulse shown in waveform 149 is applied through delay line 121 to the series connected set windings 92 through 95. The delay line 121 functions to delay the application of the separated marker pulse to the set windings 92 through 95 until after the second of the double marker pulses shown in waveform 147 has been applied to the advance windings 88 through 91, as shown in the waveform 150. The set winding 92 is wound on the magnetic core 84 in a direction opposite to that in which the set windings 93 through 95 are wound on the magnetic cores 85 through 87, respectively. The winding 92 is wound in a direction such that the reception of the delayed separated marker pulse causes the magnetic core 84 to be shifted into the "one" state, as indicated by the raised portion of waveform 154. The status of the magnetic cores 85 through 87 in the "zero" state is confirmed by the reception of the delayed marker pulse at the windings 93 through 95.

At the same time that the delayed marker pulse is applied to the set windings 92 through 95, the delayed marker pulse is also applied over lead 123 to the left hand side of the multivibrators 117 through 119. As shown in the multivibrator 117, the application of the positive marker pulse to the base electrode of transistor 124 causes transistor 124 to be cut-off and transistor 125 to conduct. As shown in the waveforms 151 through 153, the right hand side of each of the multivibrators 117 through 119 becomes conducting such that a current flow occurs at the output of the respective multivibrators.

When the first time modulated channel pulse is received, the voltage induced in the advance winding 88 causes the magnetic core 84 to start to shift from the "one" state in which it has been placed by the previous reception of the delayed marker pulse and into the "zero" state. Since the magnetic cores 85 through 87 are in a "zero" state at this time, the status thereof is merely confirmed. The base winding 99 is wound in such a direction that a negative voltage is induced therein. The emitter electrode becomes sufficiently more positive with respect to the base electrode to cause transistor 107 to conduct.

Capacitor 110 is normally charged negatively with respect to ground in a manner to be described. When the transistor 107 begins to conduct, capacitor 110 discharges and current flows over an electrical path including input winding 102, collector winding 96 and transistor 107. The voltage induced in the collector winding 96 results in a more negative voltage being induced in the base winding 99. By this regenerative action, transistor 107 conducts more heavily, and the magnetic core 84 is made to assume a "zero" state, as shown in waveform 154. The input winding 102 is wound on the magnetic core 85 in a direction such that the current flowing in the input winding 102 during the period in which transistor 107 is conducting functions to assist the current flowing in the advance winding 89 due to the reception of the first channel pulse in holding the magnetic core 85 in a "zero" state.

When the magnetic core 84 has assumed a "zero" state, the magnetic coupling therethrough drops substantially to zero and transistor 107 ceases conducting. Capacitor 110 charges through the resistor 111 from the negative terminal of the battery 112. A current of opposite polarity now flows through the input winding 102 and the current thereby flowing in the input winding 102 causes the magnetic core 85 to assume a "one" state, as shown in waveform 155. The time constant D of the resistor 111-capacitor 110-transistor 107 network is set according to the frequency of the channel pulses so that the current reversal occurs after the channel pulse applied to the advance windings 88 through 91 has terminated. The single electrical condition or "one" has, therefore, been advanced from the magnetic core 84 to the magnetic core 85.

When the transistor 107 becomes conducting and capacitor 110 discharges, a positive pulse is applied to the base electrode of transistor 125 over the electrical path including diode 126 and resistors 127, 128. Transistor 125 becomes cut-off and transistor 124 becomes conducting. As shown in the waveform 151, the current pulse at the output of the multivibrator 117 will have a trailing edge whose time is determined according to the time of the first channel pulse. In this manner, the pulse position modulated pulse received is converted into a pulse width modulation pulse. The audio component of the width modulation pulse is a function of the percentage deviation of the trailing edge and pulse amplitude. The low-pass filter 135 which may be an inductance-capacitance circuit of conventional design serves to integrate the current pulses applied thereto, producing an output signal according to the audio component of the current pulse. A signal is available at the terminal 133 which is representative of the modulating signal energy originally supplied by the generator 47 and sampled by the magnetic core 11-transistor 42 circuit of the ring counter given in Figure 3.

When the second time modulating channel pulse is received, the single electrical condition or "one" is shifted from the magnetic core 85 to the magnetic core 86. The magnetic core 86 is made to assume a "one" state, as shown in the waveform 156. The multivibrator 118 is made to assume its other stable state, and a width modulated current pulse having a trailing edge whose time is determined by the time of the second channel pulse is applied to the low-pass filter 138. This action may be determined by a comparison of the waveforms 147, 155 and 152 given in Figure 6. The filter 138 will function to integrate the current pulses applied thereto as determined by the second modulating channel pulses received to make available at the terminal 136 a signal representative of the modulating signal energy originally supplied by the generator 48 and sampled by the magnetic core 12-transistor 43 circuit of the ring counter shown in Figure 3. In the same manner, the reception of the third time modulated channel pulse will cause the second electrical condition or "one" to be shifted out of the magnetic core 86. The multivibrator 119 will produce a current pulse, as shown in waveform 153, having a trailing edge whose time is determined by the time of the third channel pulse. The low-pass filter 141 will integrate the current pulses applied thereto, and a signal will be made available at the terminal 139 which is representative of the modulating signal energy originally supplied by the generator 49 and sampled by the magnetic core 13-transistor 44 circuit. A compact distributing-demodulating circuit arrangement for use in a time division multiplex system is disclosed. By using transistors and magnetic cores to perform functions previously performed by other equipment, a circuit is provided which is characterized by low power consumption and the requirement of a minimum number of components of small size and weight.

Figure 6:
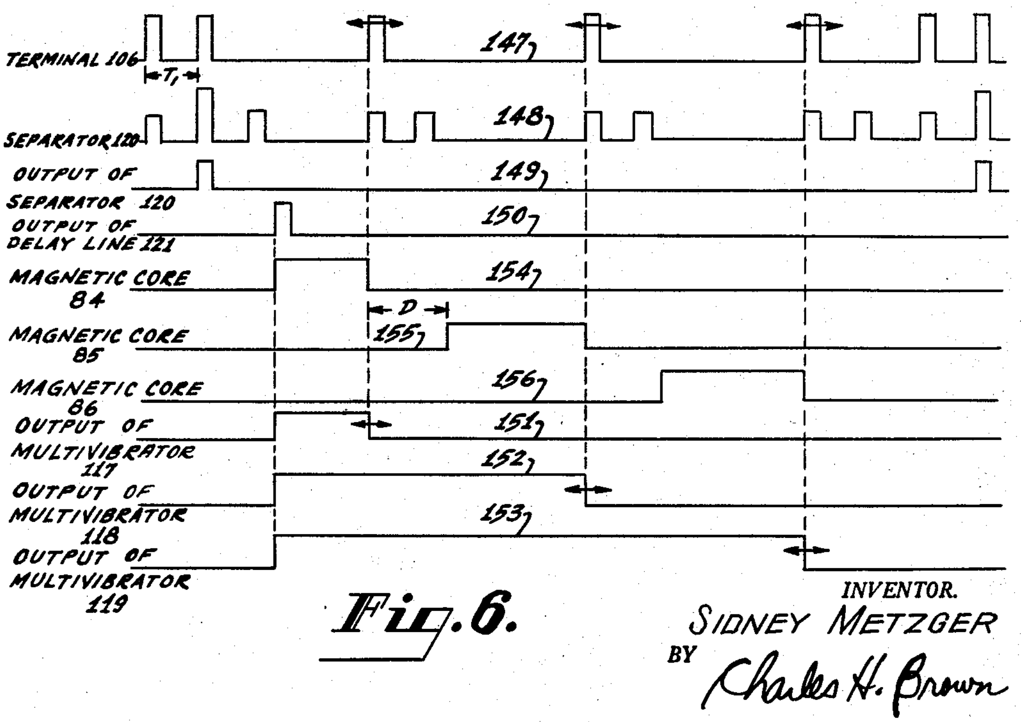
Figure 6 is a series of waveforms useful in describing the operation of the arangement shown in Figure 5.

In the operation of the circuit arrangement given in Figure 5, as shown by the waveforms 151, 152 and 153 given in Figure 6, it may be seen that the duration of the width modulated pulses produced in the respective multivibrators 117 through 119 varies from approximately the time between two adjacent incoming pulses of the multiplex signal (for the first channel 1) to approximately a full frame or cycle of the multiplex signal (for the last channel 3). The effect of the wider width modulated pulses is to increase the amount of the sampling frequency component and therefore increase the complexity of the low-pass filters 135, 138 and 141 required. The audio output is only affected by the variations of the width modulated pulses and not by their unmodulated duration.

Figure 7:
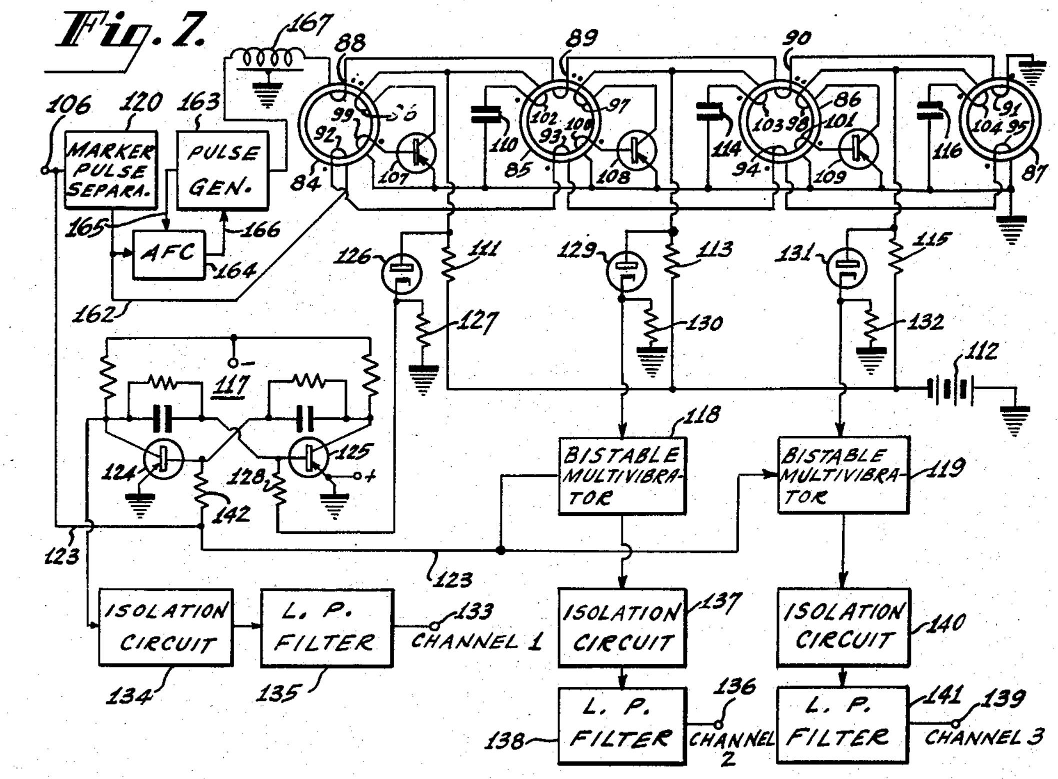
Figure 7 shows a further embodiment of a magnetic core commutator and transistorized demodulator arrangement used according to the invention at the receiving end of a pulse position modulation, time division multiplex communication system.

Figure 7 shows a modification of the distributing-demodulating circuit arrangement of the invention in which the width modulated pulses produced are all of the same average width, approximately equal to the duration between two adjacent incoming pulses of the multiplex signal. The main difference in the arrangement of Figure 7 is the requirement of a local oscillator circuit which is locked to the marker pulse of the incoming multiplex signal. The arrangement of Figure 5 does not require such an oscillator circuit.

For ease of description, the circuit components in Figure 7 similar in construction and operation to circuit components in Figure 5 have been given the same reference numerals. Referring to Figure 7, a magnetic core shift register including the magnetic core 84 through 87 is provided which is similar in construction and operation to the shift register shown in Figure 5. The right hand side of the multivibrators 117 through 119 are connected to the output circuits of the magnetic cores 84 through 86, respectively, over separate electrical paths including the respective diodes 126, 129 and 131 in the manner previously described. The output circuits of the multivibrators, in this case from the left hand side thereof, are connected to the respective terminals 133, 136 and 139 through the isolation circuits 134, 137 and 140 and the low-pass filters 135, 138 and 141.

Figure 8:
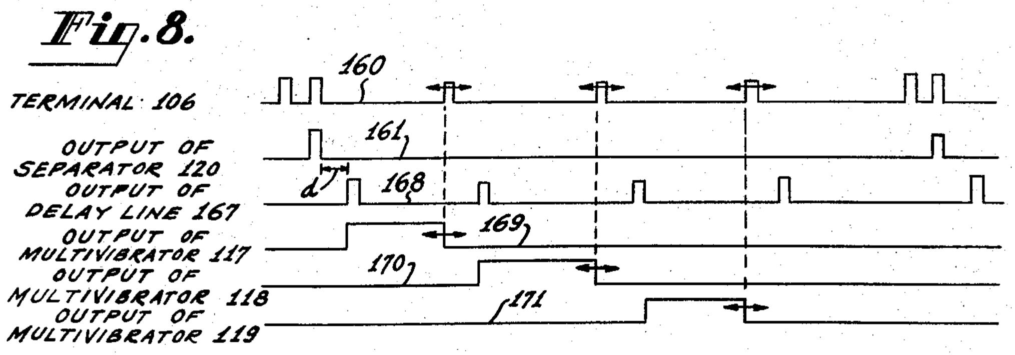
Figure 8 shows a series of waveforms useful in describing the operation of the arrangement shown in Figure 7.

The operation of the circuit arrangement given in Figure 7 will be described in connection with the waveforms shown in Figure 8. The incoming multiplex signal 160 including the double marker or synchronizing signal followed by three time modulated pulses is applied to input terminal 106. The marker pulse separator 120 functions to produce a separated marker pulse in a manner previously described. The separated marker pulse shown in the waveform 161 is fed from the separator 120 over two separate paths. The separated marker pulse is fed over one electrical path including a lead 162 and the series-connected set windings 92 through 95. The current flowing in the winding 92 causes the magnetic core 84 to assume a "one" state, and the current flowing in the windings 93 through 95 causes the magnetic cores 85 through 87 to each assume a "zero" state. The separated marker pulse is also fed to an automatic frequency control circuit 164. The control circuit 164 functions to compare the frequency of the generator 163 with that of the incoming separated marker pulse. The generator 163 is designed to produce a pulse train having a frequency $n$ times the frequency of the separated marker pulse, where $n$ is the number of channels in the multiplex signal. In the example given, the frequency of the separated marker pulse would be multipled by four. The pulse generator 163 may be of any suitable type known in the art and may include a transistor square or sine wave oscillator to which are connected the necessary pulse shaping and amplifying circuits. The automatic frequency control circuit 164 may be of the type which compares the time of the pulses produced by the generator 163 over lead 165 with the time of the separated marker pulses. If the generated pulses are delayed or arrive early with respect to the separated marker pulses, the circuit 164 functions to alter the time of the pulses produced by the generator 163 by a proper control signal fed over lead 166 for each separated marker pulse received until the proper synchronism is obtained. One type of such circuit is that called fly-wheel sync in television systems. Many examples of such systems are available in the art.

The pulse train produced by the generator 163 is applied to the series connected advance windings 88 through 91 over an electrical path including a delay line 167. The delayed pulse train is indicated in waveform 168. The delay line 167 is set to delay the pulses in the train a sufficient amount $d$ to prevent the application of a pulse of the generated pulse train and of the separated marker pulse to the magnetic cores 84 through 87 at the same time. Such a coincident condition would prevent the proper setting of the magnetic core 84 in the "one" state by the separated marker pulse, since the current flowing in the winding 88 could tend to hold the magnetic core 84 in the "zero" state.

When the first pulse shown in the waveform 168 is applied to the windings 88 through 91, the magnetic core 84 is shifted into a "zero" state. The status of the magnetic cores 85 through 87 in a "zero" state is merely confirmed. The operation of the circuit including transistor 107, capacitor 110 and resistor 111 thereafter causes magnetic core 85 to assume a "one" state in the manner previously described. During the above action, the positive pulse produced by the conduction of transistor 107 is applied to the right hand side or base electrode of transistor 125 of multivibrator 117. Transistor 125 is cut-off and transistor 124 on the left hand side of multivibrator 117 conducts. At this time, the multivibrators 118, 119 will be set so that the right hand side thereof is conducting, the left hand side being cut-off.

The first channel time modulated pulse of the incoming multiplex signal is fed over lead 123 from terminal 106 to the base electrode of transistor 124 or left hand side of multivibrator 117, as well as to the left hand side of multivibrators 118 and 119. As the left hand side of the multivibrators 118, 119 are cut-off at this time, the status thereof is merely confirmed. The application of the positive channel pulse to the base electrode of transistor 124 causes transistor 124 to be cut-off and transistor 125 to conduct. A width modulated current pulse, as shown in the waveform 169, is fed from the collector electrode of transistor 124 to the terminal 133 through the isolation circuit 134 and low-pass filter 135. The current pulse will have a trailing edge whose time varies according to the time of the received time modulated pulse. In other words, the duration of the resulting width modulated pulse will be determined by the change in condition of multivibrator 117 at the time the first channel pulse is received. A signal will appear at the terminal 133 representative of the modulating signal energy supplied by generator 47 and transmitted over channel 2 of the multiplex signal.

The circuit operations upon the reception of the channels 3 and 4 time modulated pulses will be similar. When the single electrical condition or "one" is shifted from magnetic core 85 to magnetic core 86 by the next pulse applied to the advance windings 88 through 91, the left hand side of multivibrator 118 becomes conducting and the right hand side is cut-off. Upon the application of the channel 3 time modulated pulse over lead 123, multivibrator 118 changes to its other stable state. A width modulated current pulse is applied from the multivibrator 118 to the low-pass filter 138 having a trailing edge whose time varies according to the time of the time modulated pulse received. As shown in waveform 170, the width of the pulse applied to the low-pass filter 138 is a function of the time of the channel 3 pulse. A signal will appear at terminal 136 representative of the modulating signal energy supplied by generator 48 and transmitted over channel 3 of the multiplex signal.

The next pulse applied to the advance windings 88 through 87 will cause the single electrical condition or "one" to be shifted from the magnetic core 86 to the magnetic core 87. Multivibrator 119 assumes its stable state in which the left hand side is conducting and its right hand side is cut-off. Upon the application of the channel 4 time modulated pulse over lead 123, multivibrator 119 will assume its other stable state. As shown in waveform 171, a width modulated current pulse having a trailing edge which varies according to the time of the channel 4 pulse is fed from the multivibrator 119 to the low-pass filter 141. A signal representative of the modulating signal energy supplied by generator 49 and transmitted over channel 4 of the multiplex signal will appear at terminal 139.

In the operation of the circuit arrangement shown in both Figures 5 and 7, the magnetic core shift register functions to steer or direct the incoming time modulated pulses to the proper channels. The circuits are simple and reliable in operation. By using magnetic cores and transistors, an improved distributing-demodulating circuit is provided for use in a time division multiplex modulation system. Such a system constructed according to the invention can be readily adapted for use in telemetering or other systems where size and weight, as well as low power consumption, are important factors.

Various modifications may be made to the circuit arrangements shown in Figures 5 and 7 without departing from the spirit of the invention. Although the circuits shown use the delay afforded by the resistance-capacitance circuit between magnetic cores, other types of delay lines may be substituted. Still another means of obtaining an equivalent delay is the use of two interleaved pulse trains. In the embodiment shown in Figure 5, the modulated channel pulses 1 and 3 could be applied to cores 84 and 86, and the marker pulses plus modulated channel pulse 2 could be applied to cores 85 and 87, and so on, eliminating the need for the resistance-capacitance delay circuit. Provision may also be made for clearing the shift register and setting the multivibrators 117 through 119 in their proper stable state upon the start-up of the equipment included in the invention. A test or starting signal may be applied to terminal 106 or similar means may be provided to accomplish this result.

An alternate means of demodulating the time modulated pulses, in conjection with the gating method described above, is to use a low-pass filter with an audio amplifier whose response falls off with frequency at 6 db per octave. This converts the pulse position (or phase) modulation into audio. In this way the multivibrator circuits may be dispensed with.

In certain applications, the ring counter shown in Figure 3 may be included in a system not requiring the production of a synchronizing signal. The delay line 65 is disconnected and a further signal generator 172 may be connected to the magnetic core 10 by winding 173. The first channel of the multiplex signal produced will include time modulated pulses according to the modulating signal energy supplied by the generator 172. While both the ring counter at the transmitting end and the distributing-demodulating circuit at the receiving end have been described as using P–N–P transistors, the invention is not limited to the use thereof. N–P–N transistors of P type conductivity could be used by merely changing the electrode connections and the polarity of the voltages supplied thereto in a known manner.

A four-channel multiplex system has been used in describing the invention. The multiplex system, however, may be designed to include any number of channels by merely adding or subtracting the necessary number of magnetic core stages in the ring counter at the transmitting end and the shift register at the receiving end.

A transistor-magnetic core time division multiplex modulation system is disclosed by the invention which is characterized by the requirement of a minimum number of small components resulting in low power consumption, providing a system readily adaptable for use in many applications.

Having described the invention, I claim:

1. In combination, a first train of magnetic cores connected to form a ring counter, a separate transistor regeneratively connected to each of said magnetic cores, a separate source of modulating signal energy connected to each of certain ones of said magnetic cores, means for operating said counter to sequentially sample during separate and distinct time intervals the modulating signal energy supplied by first one and then another of said sources, said counter functioning during each sampling interval to produce a modulated signal determined by the modulating signal energy sampled during said interval, an output circuit connected to all of said magnetic cores for combining said modulated signals in the order in which they are produced to form a multiplex signal for application over a single transmission path, a second train of magnetic cores connected to form a shift register, a separate transistor regeneratively connected to each of said magnetic cores in said second train, means connected to said path and responsive to said multiplex signal for causing said shift register to bring about the distribution of said modulated signals among a plurality of different channels according to said order, each of said channels including means responsive to said modulated signals for applying to a utilization circuit an output signal representative of the modulating signal energy supplied by a corresponding one of said sources.

2. In combination, a first train of magnetic cores connected to form a ring counter, a separate transistor regeneratively connected to each of said magnetic cores, a separate source of modulating signal energy connected to each of certain ones of said magnetic cores, means for operating said counter to first produce in each operating cycle thereof a synchronizing signal and to thereafter sequentially sample during separate and distinct time intervals the modulating signal energy supplied by first one and then another of said sources, said counter functioning during each sampling interval to produce a modulated signal determined by the modulating signal energy sampled during said interval, an output circuit connected to all of said magnetic cores for combining said synchronizing and modulated signals in the order in which they are produced to form a multiplex signal for application over a single transmission path, a second train of magnetic cores connected to form a shift register, a transistor regeneratively connected to each of said magnetic cores in said second train, means connected to said path and responsive to said multiplex signal for causing said shift register to bring about the distribution of said modulated signals among a plurality of different channels according to said order and in synchronism with said multiplex signal, each of said channels including means responsive to said modulated signals for applying to a utilization circuit an output signal representative of the modulating signal energy supplied by a corresponding one of said sources.

3. In combination, a first train of magnetic cores connected to form a ring counter, a separate transistor regeneratively connected to each of said magnetic cores, a separate source of modulating signal energy connected to each of certain ones of said magnetic cores, means for operating said counter to first produce in each operating cycle thereof a synchronizing signal and to thereafter sequentially sample during separate and distinct time intervals the modulating signal energy supplied by first one and then another of said sources, said counter functioning during each sampling interval to produce a time modulated pulse determined by the amplitude of the modulating signal energy sampled during said interval, an output circuit connected to all of said magnetic cores for combining said synchronizing signal and time modulated pulses in the order in which they are produced to form a multiplex signal for application over a single transmission path, a second train of magnetic cores connected to form a shift register, a transistor regeneratively connected to each of said magnetic cores in said second train, means connected to said path and responsive to said multiplex signal for causing said shift register to bring about the distribution of said time modulated pulses among a plurality of different channels according to said order and in synchronism with said multiplex signal, each of said channels including means responsive to said time modulated pulses for applying to a utilization circuit an output signal representative of the modulating signal energy supplied by a corresponding one of said sources.

4. A combination as claimed in claim 3 and wherein each of said channels includes a bistable multivibrator for converting said time modulated pulses to width modulated pulses, and a low-pass filter connected to said multivibrator and responsive to the audio component of said width modulated pulses to produce said output signal representative of the modulating signal energy supplied by a corresponding one of said sources.

5. In combination, a first train of magnetic cores connected to form a ring counter, a separate transistor regeneratively connected to each of said magnetic cores, a separate source of modulating signal energy connected to each of certain ones of said magnetic cores, means for operating said counter to first produce in each operating cycle thereof a synchronizing signal and to thereafter sequentially sample during separate and distinct time intervals the modulating signal energy supplied by first one and then another of said sources, said counter functioning during each sampling interval to produce a time modulated pulse determined by the amplitude of the modulating signal energy sampled during said interval, an output circuit connected to all of said magnetic cores for combining said synchronizing signal and time modulated pulses in the order in which they are produced to form a multiplex signal for application over a single transmission path, a second train of magnetic cores connected to form a shift register, a separate transistor regeneratively connected to each of said magnetic cores in said second train, a separate output channel including a bistable multivibrator connected to the output circuit of each of said magnetic cores in said second train, a separator circuit connected to said path, the output of said separator being connected to each of said magnetic cores in said second train and to each of said multivibrators, said separator functioning in response to said synchronizing signal to cause the first one of said magnetic cores in said second train to assume a given electrical condition and to cause each of said multivibrators to be set in the same given stable state, means for connecting each of said magnetic cores in said second train to said path and for sequentially operating said magnetic cores in said second train in response to said time modulated pulses to cause said condition to be advanced in synchronism with said time modulated pulses from magnetic core to magnetic core along said second train, each of said multivibrators being responsive to the operation of the magnetic core to which it is connected when said condition is advanced out of that magnetic core and into the next magnetic core in said second train to assume its other stable state, and a separate output circuit connected to each of said multivibrators and responsive to the operation thereof to produce an output signal for application to a utilization circuit representative of the modulating signal energy supplied by a corresponding one of said sources.

6. A combination as claimed in claim 5 and wherein each of said multivibrators functions upon assuming said other stable state to produce a width modulated pulse, a separate low-pass filter connected to each of said multivibrators, said filter being responsive to the audio component of said width modulated pulses to produce said output signal representative of the modulating signal energy supplied by a corresponding one of said sources.

7. In combination, a first train of magnetic cores connected to form a ring counter, a separate transistor regeneratively connected to each of said magnetic cores, a separate source of modulating signal energy connected to each of certain ones of said magnetic cores, means for operating said counter to first produce in each operating cycle thereof a synchronizing signal and to thereafter sequentially sample during separate and distinct time intervals the modulating signal energy supplied by first one and then another of said sources, said counter functioning during each sampling interval to produce a time modulated pulse determined by the amplitude of the modulating signal energy sampled during said interval, an output circuit connected to all of said magnetic cores for combining said synchronizing signal and time modulated pulses in the order in which they are produced to form a multiplex signal for application over a single transmission path, a second train of magnetic cores connected to form a shift register, a separate transistor regeneratively connected to each of said magnetic cores in said second train, a separate output channel including a bistable multivibrator connected to the output circuit of each of said magnetic cores in said second train, a separator circuit connected to said path and to each of said magnetic cores in said second train, said separator circuit being responsive to said synchronizing signal to cause the first magnetic core in said second train to assume a given electrical condition, a pulse generator connected to each of said magnetic cores in said second train for applying a pulse train thereto, control means connected to said separator and to said generator, said control means being responsive to the operation of said separator in response to said synchronizing signal to cause said generator to maintain said pulse train in a synchronous relationship with said synchronizing signal, said pulse train having a frequency equal to the frequency of said synchronizing signals times the number of said time modulated pulses following said last-mentioned synchronizing signal in said multiplex signal, the reception of said pulse train causing said condition to be advanced from magnetic core to magnetic core in said second train, each of said multivibrators being responsive to the operation of the magnetic core to which it is connected when said condition is advanced out of that magnetic core to assume a given one of its stable states, means for connecting each of said multivibrators to said path, said multivibrators each being responsive when placed in said given stable state to the next one of said time modulated pulses received thereby to assume its other stable state, whereby first one and then another of said multivibrators are first made to assume said given stable state and thereafter said other stable state during separate and distinct time intervals, and a separate output circuit connected to each of said multivibrators and responsive to the operation thereof to produce an output signal for application to a utilization circuit representative of the modulating signal energy supplied by a corresponding one of said sources.

8. A combination as claimed in claim 7 and wherein each of said multivibrators functions upon assuming said other stable state to produce a width modulated pulse having a trailing edge whose time varies as a function of the time of the time modulated pulse which causes said multivibrator to assume its other stable state, and a separate low-pass filter connected to each of said multivibrators responsive to the audio component of said width modulated pulses to produce said output signal representative of the modulating signal energy supplied by a corresponding one of said sources.

9. A time division multiplex communication system comprising, in combination, a first train of magnetic core circuits connected to form a ring counter, each of said circuits including a transistor regeneratively connected to said magnetic core, separate individual sources of modulating signal energy singly connected over different paths to all but one of said magnetic cores, means for continually advancing a single electrical condition from magnetic core to magnetic core along said train to place said magnetic core circuits in operation sequentially, said one magnetic core circuit being placed in operation each time said condition is advanced from said one magnetic core to the next magnetic core in said train by said means to produce a synchronizing signal, said other magnetic core circuits being sequentially placed in operation for separate and distinct time intervals to each produce a modulated signal determined by the modulating signal energy supplied to the magnetic core therein during said interval, a common output circuit connected to the output of each of said magnetic core circuits for combining said synchronizing signal and said sequentially produced modulated signals into a multiplex signal for transmission over a single transmission path, said counter producing over said transmission path in each operating cycle thereof a synchronizing signal followed in order by the modulated signals produced by first one and then another of said magnetic core circuits, a second train of magnetic cores connected to form a shift register, a transistor regeneratively connected to each of said magnetic cores in said second train, means connected to said transmission path and responsive to said multiplex signal for causing a single electrical condition to be advanced from magnetic core to magnetic core along said second train synchronously with said multiplex signal, said shift register functioning to cause the distribution of said modulated signals among a plurality of different channels according to said order in which said modulated signals are received, each of said channels including means responsive to said modulated signals for producing an output signal representative of the modulating signal energy supplied by a corresponding one of said sources, and separate means included in each of said channels for applying said output signal to a utilization circuit.

10. A time division multiplex communication system comprising, in combination, a first train of magnetic core circuits connected to form a ring counter, each of said circuits including a transistor regeneratively connected to said magnetic core, separate individual sources of modulating signal energy singly connected over different paths to all but one of said magnetic cores, means for continually advancing a single electrical condition from magnetic core to magnetic core along said train to place said magnetic core circuits in operation sequentially, said one magnetic core circuit being placed in operation each time said condition is advanced from said one magnetic core to the next magnetic core in said train by said means to produce a synchronizing signal, said other magnetic core circuits being sequentially placed in operation for separate and distinct time intervals to each produce a time modulated pulse determined by the amplitude of the modulating signal energy supplied to the magnetic core therein during said interval, a common output circuit connected to the output of each of said magnetic core circuits for combining said synchronizing signal and said sequentially produced time modulated pulses into a multiplex signal for transmission over a single transmission path, said counter producing over said transmission path in each operating cycle thereof a synchronizing signal followed in order by the time modulated pulses produced by first one and then another of said magnetic core circuits, a second train of magnetic cores connected to form a shift register, a transistor regeneratively connected to each of said magnetic cores in said second train, means connected to said transmission path and responsive to said multiplex signal for causing a single electrical condition to be advanced from magnetic core to magnetic core along said second train synchronously with said multiplex signal, said shift register functioning to cause the distribution of said time modulated pulses among a plurality of different channels according to said order in which said modulated pulses are received, each of said channels including means responsive to said modulated pulses for producing an output signal representative of the modulating signal energy supplied by a corresponding one of said sources, and separate means included in each of said channels for applying said output signal to a utilization circuit.

11. A time division multiplex communication system as claimed in claim 10 and wherein each of said channels includes a bistable multivibrator for converting said time modulated pulses to width modulated pulses, and a low-pass filter connected to said multivibrator and responsive to the audio component of said width modulated pulses to produce said output signal representative of the modulating signal energy supplied by a corresponding one of said sources.

12. A time division multiplex communication system comprising, in combination, a first train of magnetic core circuits connected to form a ring counter, each of said circuits including a transistor regeneratively connected to said magnetic core, separate individual sources of modulating signal energy singly connected over different paths to all but one of said magnetic cores, means for continually advancing a single electrical condition from magnetic core to magnetic core along said train to place said magnetic core circuits in operation, said one magnetic core circuit being placed in operation sequentially each time said condition is advanced from said one magnetic core to the next magnetic core in said train by said means to produce a synchronizing signal, said other magnetic core circuits being sequentially placed in operation for separate and distinct time intervals to each produce a time modulated pulse determined by the amplitude of the modulating signal energy supplied to the magnetic core therein during said interval, a common output circuit connected to the output of each of said magnetic core circuits for combining said synchronizing signal and said sequentially produced time modulated pulses into a multiplex signal for transmission over a single transmission path, said counter producing over said transmission path in each operating cycle thereof a synchronizing signal followed in order by the time modulated pulses produced by first one and then another of said magnetic core circuits, a second train of magnetic cores connected to form a shift register, a separate transistor regeneratively connected to each of said magnetic cores in said second train, a separate output channel including a bistable multivibrator connected to the output circuit of each of said magnetic cores in said second train, a separator circuit connected to said transmission path, the output of said separator being connected to each of said magnetic cores in said second train and to each of said multivibrators, said separator functioning in response to said synchronizing signal to cause the first one of said magnetic cores in said second train to assume a second given electrical condition and to cause each of said multivibrators to be set in the same given stable state, means for connecting each of said magnetic cores in said second train to said transmission path and for sequentially operating said magnetic cores in said second train in response to said time modulated pulses to cause said second condition to be advanced in synchronism with said modulated pulses from magnetic core to magnetic core along said second train, each of said multivibrators being responsive to the operation of the magnetic core to which it is connected when said second condition is advanced out of that magnetic core and into the next magnetic core in said second train to assume its other stable state, and a separate output circuit connected to each of said multivibrators and responsive to the operation thereof to produce an output signal for application to a utilization circuit representative of the modulating signal energy supplied by a corresponding one of said sources.

13. A time division multiplex communication system comprising, in combination, a first train of magnetic core circuits connected to form a ring counter, each of said circuits including a transistor regeneratively connected to said magnetic core, separate individual sources of modulating signal energy singly connected over different paths to all but one of said magnetic cores, means for continually advancing a single electrical condition from magnetic core to magnetic core along said train to place said magnetic core circuits in operation sequentially, said one magnetic core circuit being placed in operation each time said condition is advanced from said one magnetic core to the next magnetic core in said train by said means to produce a synchronizing signal, said other magnetic core circuits being sequentially placed in operation for separate and distinct time intervals to each produce a time modulated pulse determined by the amplitude of the modulating signal energy supplied to the magnetic core therein during said interval, a common output circuit connected to the output of each of said magnetic core circuits for combining said synchronizing signal and said sequentially produced time modulated pulses into a multiplex signal for transmission over a single transmission path, said counter producing over said transmission path in each operating cycle thereof a synchronizing signal followed in order by the time modulated pulses produced by first one and then another of said magnetic core circuits, a second train of magnetic cores connected to form a shift register, a separate transistor regeneratively connected to each of said magnetic cores in said second train, a separate output channel including a bistable multivibrator connected to the output circuit of each of said magnetic cores in said train, a separator circuit connected to said transmission path and to each of said magnetic cores in said second train, said separator circuit being responsive to said synchronizing signal to cause the first magnetic core in said second train to assume a second given electrical condition, a pulse generator connected to each of said magnetic cores in said second train for applying a pulse train thereto, control means connected to said separator and to said generator, said control means being responsive to the operation of said separator in response to said synchronizing signal to cause said generator to maintain said pulse train in synchronism with said synchronizing signal, said pulse train having a frequency equal to the frequency of said synchronizing signals times the number of said time modulated pulses following said last-mentioned synchronizing signal in said multiplex signal, the reception of said pulse train causing said second condition to be advanced from magnetic core to magnetic core in said second train, each of said multivibrators being responsive to the operation of the magnetic core to which it is connected when said second condition is advanced out of that magnetic core to assume a given one of its stable states, means for connecting each of said multivibrators to said transmission path, said multivibrators each being responsive when placed in said given stable state to the next one of said time modulated pulses received thereby to assume its other stable state, whereby first one and then another of said multivibrators are first made to assume said given stable state and thereafter said other stable state during separate and distinct time intervals, and a separate output circuit connected to each of said multivibrators and responsive to the operation thereof to produce an output signal for application to a utilization circuit representative of the modulating signal energy supplied by a corresponding one of said sources.

14. A time division multiplex modulator comprising, in combination, a train of magnetic core circuits connected to form a ring counter, each of said circuits including a single transistor regeneratively connected to said magnetic core, separate individual sources of modulating signal energy singly connected over different paths to all but one of said magnetic cores, means for continually advancing a single electrical condition from magnetic core to magnetic core along said train to place said magnetic core circuits in operation sequentially, means connected to said one magnetic core circuit and responsive to the operation thereof each time said condition is advanced from said one magnetic core to the next magnetic core in said train to produce a synchronizing signal, said other magnetic core circuits being sequentially placed in operation for separate and distinct time intervals to each produce a time modulated pulse determined by the amplitude of the modulating signal energy supplied to the magnetic core therein during said interval, a common output circuit connected to the output of each of said magnetic core circuits for combining said synchronizing signal and sequentially produced time modulated pulses into a multiplex signal for transmission over a single transmission path.

15. A time division multiplex modulator comprising, in combination, a train of magnetic core circuits connected to form a ring counter, said magnetic cores being characterized by an abrupt change in flux density when the magnetizing force exceeds a threshold value, each of said circuits including a single transistor regeneratively connected to said magnetic core, separate individual sources of modulating signal energy singly connected over different paths to all but one of said magnetic cores, means to supply a series of sawtooth waves to said magnetic cores for continually advancing a single electrical condition from magnetic core to magnetic core along said train to place said magnetic core circuits in operation sequentially, means connected to said one magnetic core circuit and responsive to the operation thereof each time said condition is advanced from said one magnetic core to the next magnetic core in said train to produce a synchronizing signal, said other magnetic core circuits being sequentially placed in operation for separate and distinct time intervals to each produce a time modulated pulse determined by the time at which the amplitude of the modulating signal energy supplied to the magnetic core therein during said interval plus the amplitude of the sawtooth supplied to said last-mentioned magnetic core exceeds said threshold value, a common output circuit connected to the output of each of said magnetic core circuits for combining said synchronizing signal and sequentially produced time modulated pulses into a multiplex signal for transmission over a single transmission path.

16. In a time division multiplex communication system, a multiplex modulator comprising, in combination, a train of magnetic core circuits connected to form a ring counter, each of said circuits including a single transistor regeneratively connected to said magnetic core, separate individual sources of modulating signal energy singly connected over different paths to all but one of said magnetic cores, means for continually advancing a single electrical condition from magnetic core to magnetic core along said train to place said magnetic core circuits in operation sequentially, means connected to said one magnetic core circuit and responsive to the operation thereof each time said condition is advanced from said one magnetic core to the next magnetic core in said train to produce a synchronizing signal, said other magnetic core circuits being sequentially placed in operation for separate and distinct time intervals to each produce a time modulated pulse determined by the amplitude of the modulating signal energy supplied to the magnetic core therein during said interval, a common output circuit connected to the output of each of said magnetic core circuits for combining said synchronizing signal and sequentially produced time modulated pulses into a multiplex signal for transmission over a single transmission path, and means connected to said transmission path and responsive to said multiplex signal for distributing said time modulated pulses among a plurality of channels according to the order in which said time modulated pulses are received, each of said channels including means responsive to said time modulated pulses to produce an output signal for application to a utilization circuit representative of the modulating signal energy supplied by a corresponding one of said sources.

17. A time division multiplex demodulator comprising, in combination, an input terminal to which is applied a multiplex signal including in each frame a synchronizing signal followed by the same number of serially appearing time modulated pulses, a train of magnetic cores connected to form a shift register, a separate transistor regeneratively connected to each of said magnetic cores, a separate output channel including a bistable multivibrator connected to the output circuit of each of said magnetic cores, a separator circuit connected to said terminal, to said multivibrator and to each of said magnetic cores, said separator functioning in response to said synchronizing signal to cause the first one of the magnetic cores in said train to assume a given electrical condition and to cause each of said multivibrators to be set in the same given stable state, means connected to said terminal and to all of the said magnetic cores responsive to said time modulated pulses to cause said condition to be advanced in synchronism with said pulses from magnetic core to magnetic core along said train, each of said multivibrators being responsive to the operation of the magnetic core to which it is connected when said condition is advanced out of that magnetic core and into the next magnetic core in said train to assume its other stable state, and a separate output circuit connected to each of said multivibrators and responsive to the operation thereof to produce an output signal for application to a utilization circuit.

18. A time division multiplex demodulator as claimed in claim 16 and wherein each of said multivibrators functions upon assuming said other stable state to produce a width modulated pulse, a separate low-pass filter connected to each of said multivibrators and responsive to the audio component of the width modulated pulses applied thereto to produce said output signal for application to a utilization circuit.

19. A time division multiplex demodulator comprising, in combination, a train of magnetic cores connected to form a shift register, a separate transistor regeneratively connected to each of said magnetic cores, a separate output channel including a bistable multivibrator connected to the output circuit of each of said magnetic cores, an input terminal to which is applied a multiplex signal including in each frame a synchronizing signal followed by the same number of serially-appearing time modulated pulses, a separator circuit connected to said terminal and to each of said magnetic cores, said separator circuit being responsive to said synchronizing signal to cause the first magnetic core in said train to assume a given electrical condition, a pulse generator connected to each of said magnetic cores for applying a pulse train thereto, control means connected to said separator and to said generator, said control means being responsive to the operation of said separator in response to said synchronizing signal to cause said generator to maintain said pulse train in a proper synchronous relationship with said synchronizing signal, said pulse train having a frequency equal to the frequency of said synchronizing signal times the number of time modulated pulses following said last-mentioned synchronizing signal, the reception of said pulse train causing said condition to be advanced from magnetic core to magnetic core along said train, each of the mutivibrators being responsive to the operation of the magnetic core to which it is connected when said condition is advanced out of that magnetic core and into the next in said train to assume a given one of its stable states, means for connecting each of said multivibrators to said terminal, said multivibrators each being responsive when placed in said given stable state to the next one of said time modulated pulses applied thereto from said terminal to assume its other stable state, whereby first one and then another of said multivibrators are made to assume said given stable state and thereafter said other stable state during separate and distinct time intervals, and a separate output circuit connected to each of said multivibrators and responsive to the operation thereof to produce an output signal for application to a utilization circuit.

20. A time division multiplex demodulator as claimed in claim 19 and wherein each of said multivibrators functions to produce upon each change from said given to said other stable state a width modulated pulse, a separate low-pass filter connected to each of said multivibrators and responsive to the audio component of said width modulated pulses to produce said output signal.

21. In combination, a train of magnetic core circuits connected to form a ring counter, said magnetic cores being characterized by an abrupt change in flux density when an applied magnetizing force exceeds a threshold value, each of said circuits including a transistor regeneratively connected to said magnetic core, separate individual sources of modulating signal energy singly connected over different paths solely to said magnetic cores, means to supply a series of sawtooth waves to said magnetic cores for continually advancing a single electrical condition from magnetic core to magnetic core along said train to place first one and then another of said magnetic core circuits in operation, said magnetic core circuits being sequentially placed in operation for separate and distinct time intervals to each produce in turn at the output of said transistor a time modulated pulse determined by the time at which the amplitude of the modulating signal energy plus the amplitude of the sawtooth supplied to the magnetic core therein during said interval exceeds said threshold value, a common output circuit connected to the output of the transistor in each of said magnetic core circuits for combining said sequentially produced time modulated pulses into a multiplex signal for transmission over a single transmission path.

References Cited in the file of this patent

UNITED STATES PATENTS

| | | |
|---|---|---|
| 2,719,773 | Karnaugh | Oct. 4, 1955 |
| 2,719,961 | Karnaugh | Oct. 4, 1955 |
| 2,719,962 | Karnaugh | Oct. 4, 1955 |
| 2,742,632 | Whitely | Apr. 17, 1956 |
| 2,772,370 | Bruce et al. | Nov. 27, 1956 |
| 2,794,130 | Newhouse et al. | May 28, 1957 |
| 2,800,596 | Bolie | July 23, 1957 |
| 2,816,169 | Pawley | Dec. 10, 1957 |